(12) United States Patent
Matthews et al.

(10) Patent No.: US 9,860,453 B2
(45) Date of Patent: Jan. 2, 2018

(54) SYSTEMS AND METHODS FOR ESTIMATING SKY LIGHT PROBES FOR OUTDOOR IMAGES

(71) Applicant: Disney Enterprises, Inc., Burbank, CA (US)

(72) Inventors: Iain Matthews, Pittsburgh, PA (US); Jean-Francois Lalonde, Quebec (CA)

(73) Assignee: DISNEY ENTERPRISES, INC., Burbank, CA (US)

( * ) Notice: Subject to any disclaimer, the term of this patent is extended or adjusted under 35 U.S.C. 154(b) by 298 days.

(21) Appl. No.: 14/614,214

(22) Filed: Feb. 4, 2015

(65) Prior Publication Data

US 2016/0150143 A1 May 26, 2016

Related U.S. Application Data

(60) Provisional application No. 62/084,967, filed on Nov. 26, 2014.

(51) Int. Cl.
| | |
|---|---|
| *H04N 5/265* | (2006.01) |
| *H04N 5/235* | (2006.01) |
| *H04N 5/232* | (2006.01) |

(52) U.S. Cl.
CPC ......... *H04N 5/2351* (2013.01); *H04N 5/2355* (2013.01); *H04N 5/23229* (2013.01); *H04N 5/265* (2013.01)

(58) Field of Classification Search
None
See application file for complete search history.

(56) References Cited

U.S. PATENT DOCUMENTS

| | | | |
|---|---|---|---|
| 6,628,298 B1* | 9/2003 | Debevec | G06T 15/506 345/632 |
| 2015/0146972 A1* | 5/2015 | Lalonde | G06K 9/4661 382/155 |

OTHER PUBLICATIONS

Ackermann et al., "How Bright is the Moon? Recovering and Using Absolute Luminance Values from Internet Images", Computational Color Imaging, 2013, p. 90-104, vol. 7786, Springer, Berlin, Heidelberg.*
Debevec et al., "A Single-Shot Light Probe", ACM SIGGRAPH 2012 Talks, 2012, p. 10:1-10:1, ACM, New York, NY, USA.*
Nishino et al., "Eyes for Relighting", ACM Transactions on Graphics ((TOG)—Proceedings of ACM SIGGRAPH 2004, Aug. 2004, p. 477-487, vol. 23—issue 3, ACM, New York, NY, USA.*

(Continued)

*Primary Examiner* — Joseph Ustaris
*Assistant Examiner* — Edemio Navas, Jr.
(74) *Attorney, Agent, or Firm* — Sheppard, Mullin, Richter & Hampton LLP

(57) ABSTRACT

Methods and systems for estimating HDR sky light probes for outdoor images are disclosed. A precaptured sky light probe database is leveraged. The database includes a plurality of HDR sky light probes captured under a plurality of different illumination conditions. A HDR sky light probe is estimated from an outdoor image by fitting a three dimensional model to an object of interest in the image and solving an inverse optimization lighting problem for the 3D model where the space of possible HDR sky light probes is constrained by the HDR sky light probes of the database.

17 Claims, 11 Drawing Sheets
(6 of 11 Drawing Sheet(s) Filed in Color)

(56) References Cited

OTHER PUBLICATIONS

Preetham et al., A Practical Analytic Model for Daylight, SIGGRAPH '99 Proceedings of the 26th Annual Conference on Computer Graphics and Interactive Techniques, 1999, p. 91-100, ACM Press/Addison-Wesley Publishing, Co., New York, NY, USA.*
Stumpfel et al., "Direct HDR capture of the Sun and Sky", AFRIGRAPH '04 Proceedings of the 3rd International Conference on Computer Graphics, Virtual Reality, Visuallisation and interaction in Africa, 2004, p. 145-149, ACM, New York, NY, USA.*
Wang et al., "Face Re-lighting from a Single Image Under Harsh Lighting Conditions", 2007 IEEE Conference on Computer Vision and Pattern Recognition (CVPR), Jun. 2007, p. 1-8, IEEE, Minneapolis, MN, USA.*
Lalonde et al., "Selfie Sky Probes: Capturing HDR Outdoor Light Probes with a Single LDR Self-Portrait", SIGGRAPH Asia 2014, 2014, p. 1-9.*
Ackermann, J., et al., How bright is the moon? Recovering and using absolute luminance values from internet images, » Computational Color Imaging, 2013, pp. 90-104, vol. 7786, Springer, Berlin, Heidelberg.
Barron, J. T., et al., Color constancy, intrinsic images, and shape estimation, » Computer Vision—ECCV 2012, Oct. 2012, pp. 57-70, vol. 7575, Springer, Berlin, Heidelberg.
Barron, J. T., et al., Intrinsic scene properties from a single RGB-D image, 2013 IEEE Conference on Computer Vision and Pattern Recognition (CVPR), Jun. 2013, pp. 17-24, IEEE, Portland, OR, USA.
Bitouk, D., et al., Face swapping: automatically replacing faces in photographs, ACM Transactions on Graphics (TOG)—Proceedings of ACM SIGGRAPH 2008, Aug. 2008, pp. 39:1-39:8, vol. 27—issue 3, ACM, New York, NY, USA.
Calian, D. A., et al., The shading probe: Fast appearance acquisition for mobile AR, SIGGRAPH Asia 2013 Technical Briefs, Nov. 2013, pp. 20:1-20:4, vol. 32—issue 6, ACM, New York, NY, USA.
Dale, K., et al., Video face replacement, ACM Transactions on Graphics (TOG)—Proceedings of ACM SIGGRAPH Asia 2011, Dec. 2011, pp. 130:1-130:10, vol. 30—issue 6, ACM, New York, NY, USA.
Debevec, P., et al., Recovering high dynamic range radiance maps from photographs, SIGGRAPH '97 Proceedings of the 24th annual conference on Computer graphics and interactive techniques, 1997, pp. 369-378, ACM Press/Addison-Wesley Publishing Co., New York, NY, USA.
Debevec, P., et al., A single-shot light probe, ACM SIGGRAPH 2012 Talks, 2012, pp. 10:1-10:1, ACM, New York, NY, USA.
Debevec, P., Rendering synthetic objects into real scenes: bridging traditional and image-based graphics with global illumination and high dynamic range photography, SIGGRAPH '98 Proceedings of the 25th annual conference on Computer graphics and interactive techniques, 1998, pp. 189-198, ACM, New York, NY, USA.
Haber, T., et al., Relighting objects from image collections, 2009 IEEE Conference on Computer Vision and Pattern Recognition (CVPR), Jun. 2009, pp. 627-634, IEEE, Miami, FL, USA.
Hosek, L., et al., An analytic model for full spectral sky-dome radiance, ACM Transactions on Graphics (TOG)—Proceedings of ACM SIGGRAPH 2012, Jul. 2012, pp. 95:1-95:9, vol. 31—issue 4, ACM, New York, NY, USA.
Jablonski, N., et al., The evolution of human skin coloration, Journal of human evolution, 2000, pp. 57-106, vol. 39—issue 1, Academic Press.
Karsch, K., et al., Rendering synthetic objects into legacy photographs, ACM Transactions on Graphics (TOG)—Proceedings of ACM SIGGRAPH Asia 2011, Dec. 2011, pp. 157:1-157:12, vol. 30—issue 6, ACM, New York, NY, USA.
Karsch, K., et al., Automatic scene inference for 3D object compositing, ACM Transactions on Graphics (TOG), Aug. 2009, pp. 106:1-106:14, vol. 28—issue 4, ACM, New York, NY, USA.

Khan, E. A., et al, Image-based material editing, ACM Transactions on Graphics (TOG)—Proceedings of ACM SIGGRAPH 2006, Jul. 2006, pp. 654-663, vol. 25—issue 3, ACM, New York, NY, USA.
Kholgade, N., et al., 3D object manipulation in a single photograph using stock 3D models, ACM Transactions on Graphics (TOG)—Proceedings of ACM SIGGRAPH 2014, Jul. 2014, pp. 127:1-127:13, vol. 33—issue 4, ACM, New York, NY, USA.
Lalonde, J.-F., et al., Webcam Clip Art: Appearance and illuminant transfer from time-lapse sequences, ACM Transactions on Graphics (TOG)—Proceedings of ACM SIGGRAPH Asia 2009, Dec. 2009, pp. 131:1-131:10, vol. 28—issue 5, ACM, New York, NY, USA.
Lalonde, J.-F., et al., Estimating the natural illumination conditions from a single outdoor image, International Journal of Computer Vision, Jun. 2012, pp. 123-145, vol. 98—issue 2, Springer, US.
Lombardi, S., et al., Reflectance and natural illumination from a single image, Computer Vision—ECCV 2012, 2012, pp. 582-595, vol. 7577, Springer, Berlin, Hidelberg
Lopez-Moreno, J., et al., Compositing images through light source detection, Computers & Graphics 2010, pp. 698-707, vol. 34—issue 6, Elsevier.
Lopez-Moreno, J., et al., Measuring the perception of light inconsistencies, Proceedings of the 7th Symposium on Applied Perception in Graphics and Visualization (APGV '10), 2010, pp. 25-32, ACM, New York, NY, USA.
Manakov, A., et al., reconfigurable camera add-on for high dynamic range, multispectral, polarization, and light-field imaging, ACM Transactions on Graphics (TOG)—SIGGRAPH 2013 Conference Proceedings, Jul. 2013, pp. 47:1-47:14, vol. 32—issue 4, ACM, New York, NY, USA.
Ng, R., et al., Triple product wavelet integrals for all-frequency relighting, ACM Transactions on Graphics ( (TOG)—Proceedings of ACM SIGGRAPH 2004, Aug. 2004, pp. 477-487, vol. 23—issue 3, ACM, New York, NY, USA.
Nishino, K., et al., Eyes for relighting, ACM Transactions on Graphics (TOG)—Proceedings of ACM SIGGRAPH 2004, Aug. 2004, pp. 704-711, vol. 23—issue 3, ACM, New York, NY, USA.
Panagopoulos, A., et al., Illumination estimation and cast shadow detection through a higher-order graphical model, 2011 IEEE Conference on Computer Vision and Pattern Recognition (CVPR), Jun. 2011, pp. 673-680, IEEE, Providence, RI, USA.
Perez, R., et al., All-weather model for sky luminance distribution—preliminary configuration and validation, Solar Energy, 1993, pp. 235-245, vol. 50—issue 3, Pergamon Press Ltd., USA.
Preetham, A. J., et al., A practical analytic model for daylight, SIGGRAPH '99 Proceedings of the 26th annual conference on Computer graphics and interactive techniques, 1999, pp. 91-100, ACM Press/Addison-Wesley Publishing Co., New York, NY, USA.
Ramamoorthi, R., et al, On the relationship between radiance and irradiance: determining the illumination from images of a convex lambertian object, Journal of the Optical Society of America, Oct. 2001, pp. 2448-2459, vol. 18—issue 10, Optical Society of America.
Reda, I., et al., Solar position algorithm for solar radiation applications, Technical Report, Revised Jan. 2008, pp. 1-40, National Renewable Energy Laboratory (NREL), Golden, CO, USA.
Reinhard, E., et al., High dynamic range imaging, 2006, Morgan Kaufman, San Francisco, CA, USA.
Saragih, J. M., et al., Face alignment through subspace constrained mean-shifts, 2009 IEEE 12th International Conference on Computer Vision, 2009, pp. 1034-1041, IEEE, Kyoto, Japan.
Sato, I., et al., Illumination from shadows, IEEE Transactions on Pattern Analysis and Machine Intelligence, Mar. 2003, pp. 290-300, vol. 25—issur 3, IEEE.
Scaramuzza, D., et al., A toolbox for easy calibrating omnidirectional cameras, 2006 IEEE/RSJ International Conference on Intelligent Robots and Systems, Oct. 2006, pp. 5695-5701, IEEE, Beijing, China.
Stumpfel, J., et al., Direct HDR capture of the sun and sky, AFRIGRAPH '04 Proceedings of the 3rd international conference on Computer graphics, virtual reality, visualisation and interaction in Africa, 2004, pp. 145-149, ACM, New York, NY, USA.

(56) References Cited

OTHER PUBLICATIONS

Tocci, M. D., et al., A versatile HDR video production system, ACM Transactions on Graphics (TOG)—Proceedings of ACM SIGGRAPH 2011, Jul. 2011, pp. 41: 1-41:10, vol. 30—issue 4, ACM, New York, NY, USA.

Wang, Y., et al., Face re-lighting from a single image under harsh lighting conditions, 2007 IEEE Conference on Computer Vision and Pattern Recognition (CVPR), Jun. 2007, pp. 1-8, IEEE, Minneapolis, MN, USA.

Wen, Z., et al., Face relighting with radiance environment maps, 2003 IEEE Computer Society Conference on Computer Vision and Pattern Recognition, Jun. 2003, pp. 1-12, vol. 2, IEEE.

Lalonde, J-F., et al., Selfie Sky Probes: Capturing HDR Outdoor Light Probes with a Single LDR Self-Portrait, SIGGRAPH Asia 2014, 2014, pp. 1-9.

* cited by examiner

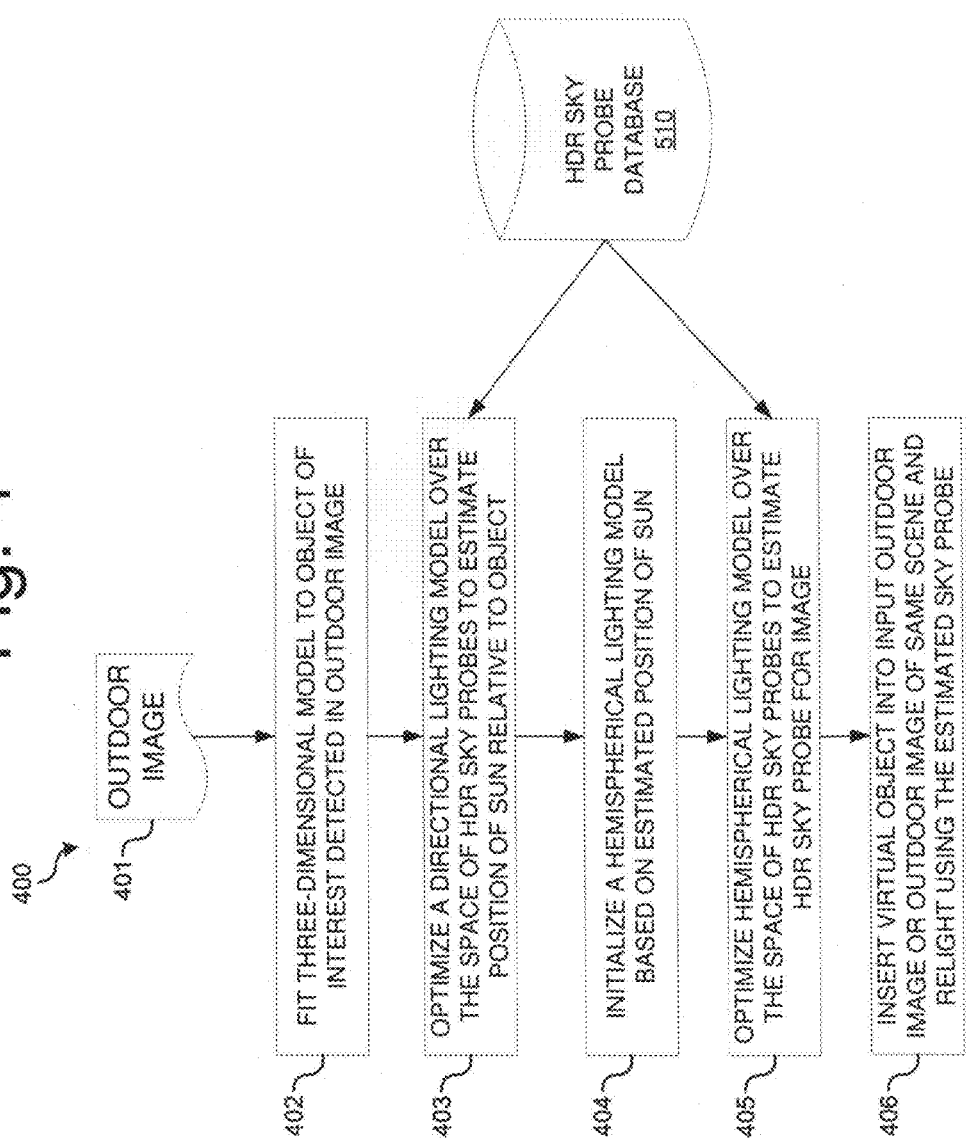

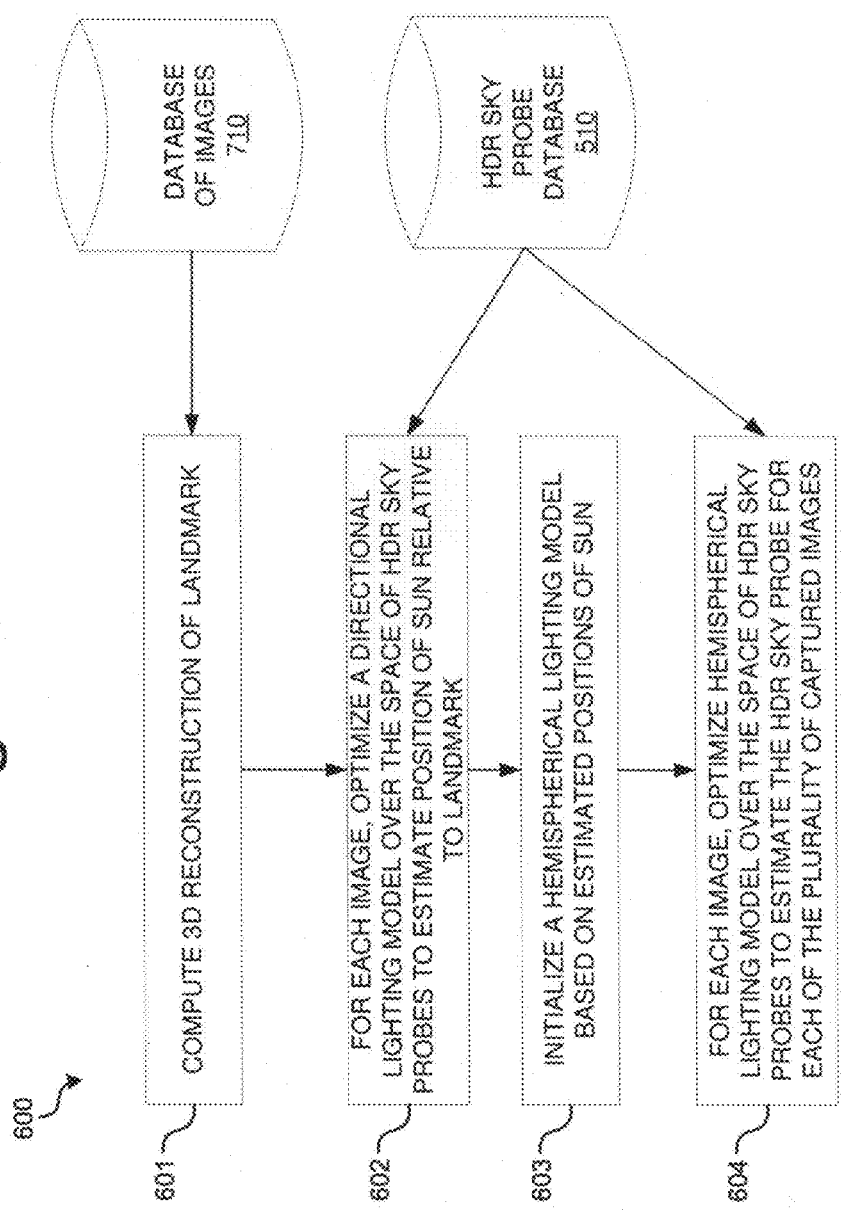

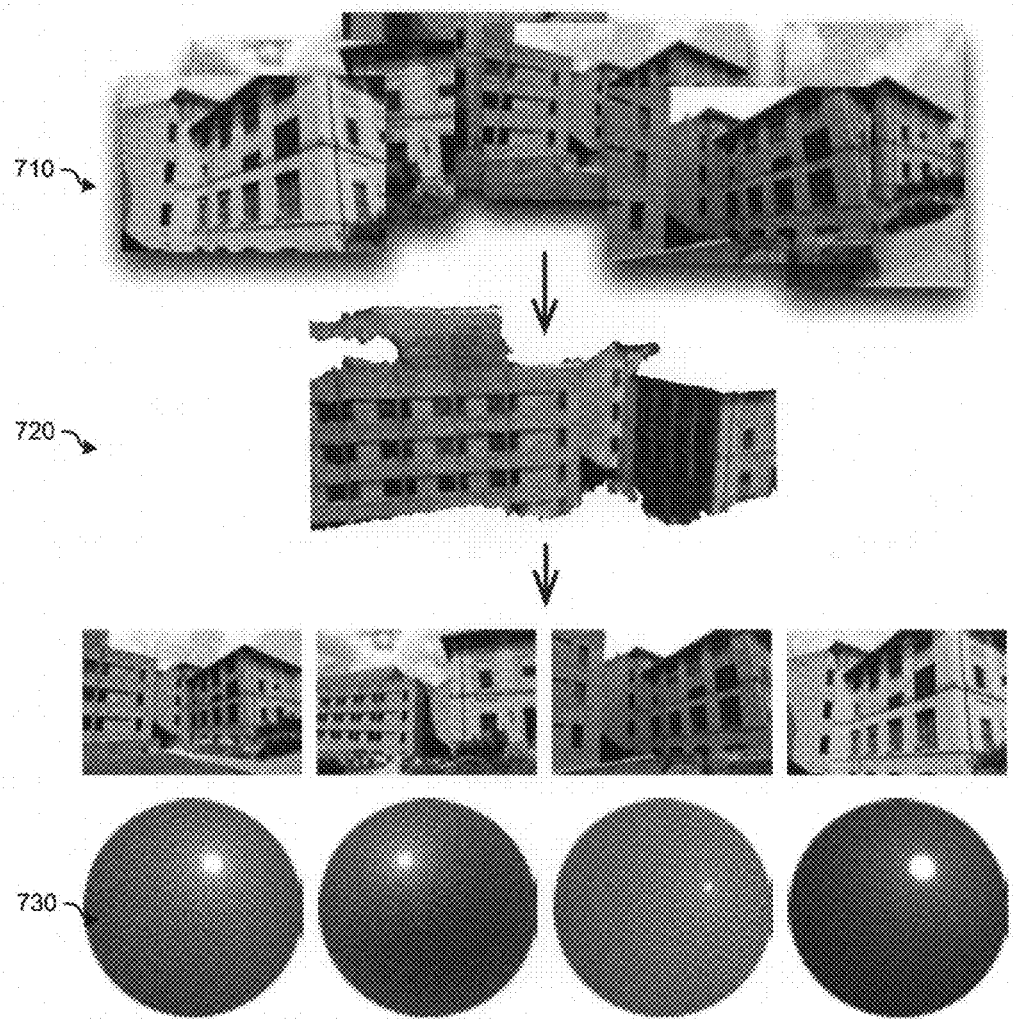

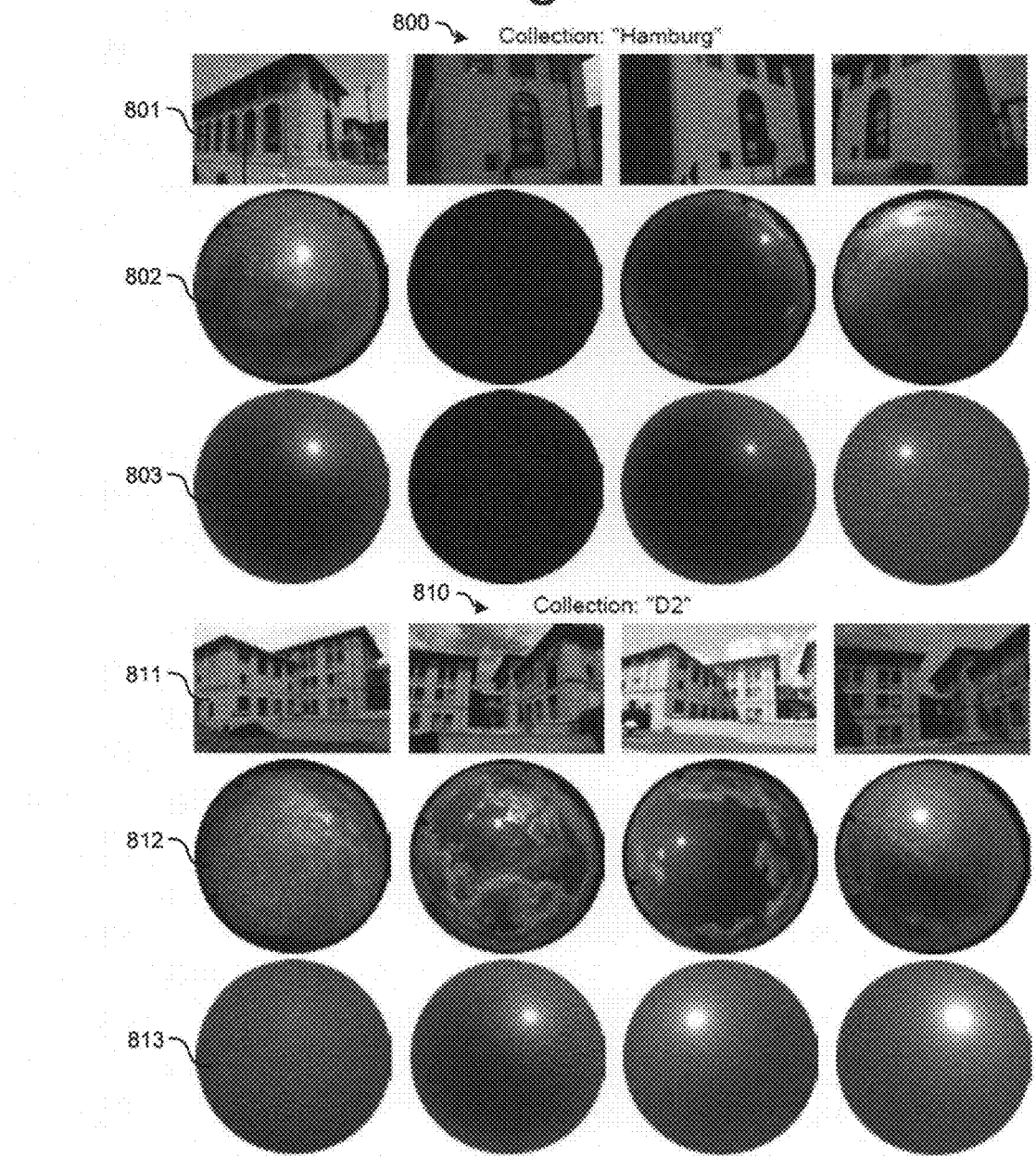

SYSTEMS AND METHODS FOR ESTIMATING SKY LIGHT PROBES FOR OUTDOOR IMAGES

CROSS-REFERENCE TO RELATED APPLICATIONS

This application claims the benefit of U.S. Provisional Application No. 62/084,967 filed on Nov. 26, 2014, which is incorporated herein by reference in its entirety.

TECHNICAL FIELD

The present disclosure relates generally to sky light probes, and more particularly, some embodiments relate to systems and methods for estimating sky light probes for outdoor images.

DESCRIPTION OF THE RELATED ART

Image-based lighting technology is a key component of creating photo-realistic computer-generated content for insertion in images and video. Movie special effects shots, for example, often contain several virtual objects that are inserted and relighted into the movie after the movie was filmed. Current methods of realistically illuminating these special effects objects require direct capture of the illumination conditions of the scene in which the virtual object is inserted.

In general, existing techniques for capturing illumination conditions of a scene require some combination of taking multiple images of the scene, capturing a specially designed calibration object (e.g. a chrome sphere) at the scene, and using expensive hardware equipment such as custom DSLR cameras. The expense, computational demand, and limitations of such techniques make image-based lighting technology inaccessible to the casual user. Additionally, conventional techniques cannot be applied to images whose illumination conditions were not recorded at the time of image capture.

BRIEF SUMMARY OF THE DISCLOSURE

Systems and methods are provided in various embodiments for estimating sky light probes for outdoor images. In one embodiment of the technology disclosed herein, an image capturing device includes a camera for capturing an outdoor image; one or more processors; and one or more non-transitory computer-readable mediums operatively coupled to at least one of the one or more processors and having instructions stored thereon that, when executed by at least one of the one or more processors, cause at least one of the one or more processors to: fit a three-dimensional (3D) model to an object of interest in the outdoor image; and estimate a sky light probe for the outdoor image by applying an inverse optimization lighting algorithm based on the fitted 3D model. In implementations of this embodiment, applying an inverse optimization lighting algorithm based on the fitted 3D model includes constraining lighting of the optimization light algorithm to a space of precaptured sky light probes captured under a plurality of sky illumination conditions. In further implementations of this embodiment, the object of interest is a human face.

In another embodiment of the technology disclosed herein, the illumination parameters of the estimated sky light probe include sun illumination parameters based on a sun model and sky illumination parameters based on a sky model, where the sun illumination parameters include a position of the sun. In implementations of this embodiment, the sun model is based on a double exponential sun model, and the sky model is based on a Preetham sky model.

In another embodiment of the technology disclosed herein, applying an inverse optimization light algorithm includes optimizing a directional lighting model over the space of precaptured sky light probes to estimate a sun position. In implementations of this embodiment, applying an inverse optimization light algorithm further includes: initializing a hemispherical lighting model based on the estimated sun position; and optimizing the hemispherical lighting model over the space of precaptured sky light probes.

In further embodiments of the technology disclosed herein, the one or more non-transitory computer-readable mediums when executed by at least one of the one or more processors, further cause at least one of the one or more processors to: insert a virtual 3D object into the outdoor image; and relight the virtual 3D object using the estimated sky light probe.

In yet another embodiment of the technology disclosed herein, the captured outdoor image is a low dynamic range (LDR) image; the precaptured sky light probes are high dynamic range (HDR) sky light probes; and the estimated sky light probe is an HDR sky light probe.

In yet another embodiment of the technology disclosed herein, a method for estimating sky light probes from outdoor images includes obtaining a plurality of images from a storage, each of the plurality of images associated with a landmark; using one or more processors to compute a three-dimensional reconstruction of the landmark from the plurality of images based on a structure-from-motion algorithm; and estimating a sky light probe for each of the plurality of images by applying an inverse optimization lighting algorithm based on the three-dimensional reconstruction, where lighting of the optimization light algorithm is constrained to a space of precaptured sky light probes captured under a plurality of sky illumination conditions.

Other features and aspects of the disclosed method and system will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure, in accordance with one or more various embodiments, is described in detail with reference to the following figures. The figures are provided for purposes of illustration only and merely depict typical or example embodiments of the disclosure.

FIG. 4 is an operational flow diagram illustrating an example process for estimating an HDR sky light probe for a single outdoor image based on a database of sky light probes and an object of interest in the captured image.

FIG. 5B illustrates a plurality of LDR input images with a corresponding rendered selfie, images with a virtual object relit by the ground truth light probe of the input images, images with a virtual object relit by a double exponential sun and Preetham sky model fit for the ground truth light probes, and images with a virtual object relit by the sky light probe estimated from the input images using the process of FIG. 4.

FIG. 6 is an operational flow diagram operational illustrating an example process for estimating a plurality of HDR sky light probes for a corresponding plurality of outdoor images associated with a scene.

FIG. 7 illustrates example outputs generated by the process flow of FIG. 6 based on an example set of input landmark images.

FIG. 8 illustrates two sets of LDR input images associated with two different landmarks, the ground truth sky light probes for the input images, and the corresponding HDR sky light probes estimated for the input images using the process of FIG. 6.

DETAILED DESCRIPTION

Figure 1:
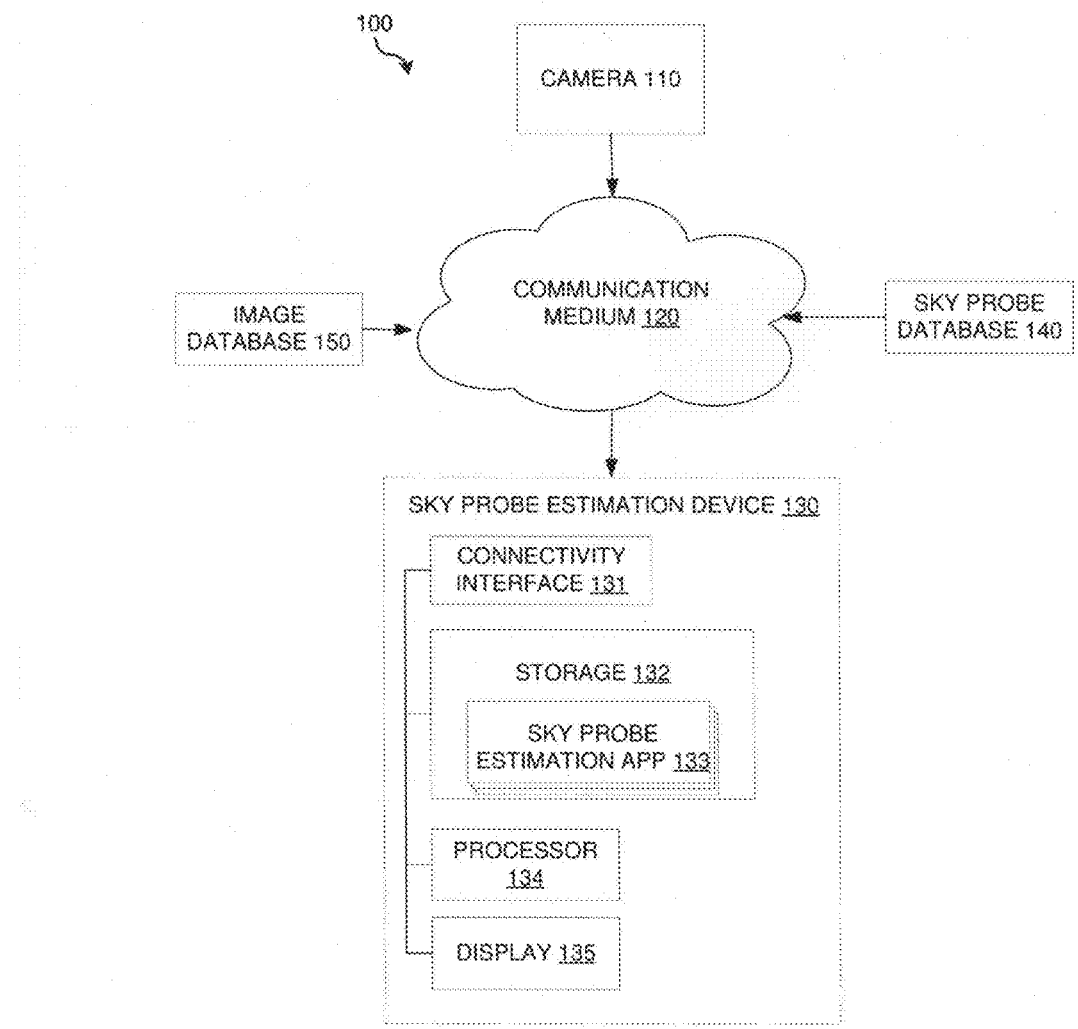
FIG. 1 illustrates an example communication environment in accordance with the present disclosure.

In accordance with the present disclosure, systems and methods for estimating high-dynamic-range (HDR) sky light probes for outdoor images (e.g., a photograph or video frame) are disclosed. The disclosed methods provide the benefit of estimating the HDR sky light probe (i.e. illumination conditions of the sky) for a single lower-dynamic-range (LDR) outdoor image (or HDR outdoor image) captured with a consumer-grade camera (e.g. a smartphone camera). No specialized equipment, calibration target, or pre-capture of the image's illumination conditions is needed. In additional embodiments, the disclosed methods may be used to estimate a plurality of HDR sky light probes for a corresponding plurality of LDR images associated with a landmark.

In related application Ser. No. 14/091,270 filed on Nov. 26, 2013, and which is hereby incorporated by reference in its entirety, light probes were predicted for outdoor images based on a learned mapping from the outdoor image's features to light probe illumination parameters. The learned mapping was based on a light probe database that included a plurality of images, image features for each of the plurality of images, and a captured light probe for each of the plurality of images.

The disclosed methods leverage a location-independent database of HDR sky light probes captured under a plurality of illumination conditions to constrain the estimated HDR sky light probe to lie in the space of captured HDR sky light probes. As will be further described below, the disclosed methods may be used to estimate an accurate HDR sky light probe for an LDR image regardless of the image's location.

As used herein, a "LDR" image refers to an image that represents a reduced range of intensity values, often using a bit depth of 8 bits per pixel or less (e.g., 4, 2, or 1). An "HDR" image refers to an image able to represent a much wider dynamic range of intensity values, often with a bit depth of 16 bits per pixel or more (e.g., 24, 32, 64, etc.). While the systems and methods disclosed herein are described with reference to estimating a HDR sky light probe from a single LDR image, they may also be implemented to estimate a HDR sky light probe from a HDR image. For example, a 32 or 64 bit sky light probe may be estimated from a 16, 24, or 32 bit image.

Before describing the invention in detail, it is useful to describe an example communications environment in which the invention can be implemented. FIG. 1A illustrates such an example communications environment 100. In communications environment 100, camera 110 captures an outdoor image that is transmitted to sky light probe estimation device 130 over communication medium 120. Sky light probe estimation device 130 estimates an HDR sky light probe for the captured image. In one embodiment, camera 110 is a video recording device that captures a plurality of images (frames). In this embodiment, sky light probe estimation device 130 may estimate a sky light probe for each of the plurality of frames to relight a virtual object into the video.

Sky light probe estimation device 130 may comprise any computing device (tablet, smartphone, laptop, workstation, etc.) configured to receive a captured outdoor image and estimate a HDR sky light probe for the image (i.e. the illumination conditions of the sky) based on a three-dimensional modeling of an object in the image. As illustrated, sky light probe estimation device 130 comprises a connectivity interface 131, storage 132 for storing a sky light probe estimation application 133, processor 134, and display 135. In alternative embodiments, camera 110 may be integrated into sky light probe estimation device 130.

Connectivity interface 131 connects sky light probe estimation device to camera 110, sky light probe database 140, and one or more image databases 150 through communication medium 120. The medium 120 may comprise a wireless network system such as a cellular network, a satellite network, a wireless local area network, a Bluetooth system, or the like. The medium may additionally comprise a wired network system, such as a coaxial cable system, a fiber optic cable system, an Ethernet cable system, a USB system, or the like.

Processor 134 executes a sky light probe estimation application 133 for estimating an HDR sky light probe of an outdoor image or photograph. The estimated sky light probe may be used to relight a virtual object (e.g. a character, an animal, a building, a tree, etc.) inserted into the image. Sky light probe estimation application 133 may be integrated as part of an animation application, a video editing application, an image editing application, a video game design application, or some combination thereof. Sky light probe estimation application is used in conjunction with sky light probe database 140 to estimate the sky lighting conditions of an outdoor image so that a virtual object may be inserted and relighted in the image. As illustrated in FIG. 1, sky light probe database 140 is accessed by sky light probe estimation device 130 over communication medium 120. In another embodiment, sky light probe database 140 may reside in storage 132.

Display 135 may display a photograph or video with an inserted virtual object that is relighted using sky light probe estimation application 133. Additionally, display 134 may provide a touchscreen user interface that permits a user to interact with sky light probe estimation application 133.

Sky light probe estimation device 130 is implemented in any environment where the realistic relighting of virtual objects into outdoor photographs is desired. The environment may or may not require real-time sky light probe estimation. For example, sky light probe estimation device 130 may be used in a movie post-filming process to relight virtual objects such as special effects or CGI characters into filmed movie frames. As another example, sky light probe estimation device 130 may be used in the design of video games to dynamically insert virtual video game characters or objects into photographs or video.

In another example, the environment is a theme park where camera 110 photographs theme park attendees and sky light probe estimation device 130 thereafter inserts and relights a virtual object into the photograph. In yet another example, sky light probe estimation device 130 is a portable consumer device (e.g. smartphone) with an installed sky light probe estimation application and camera. In this example, the user of the portable device may use the sky light probe estimation application to estimate the HDR sky light probe of a photograph captured by the camera, and thereafter insert and relight virtual objects in the captured photograph.

Figure 2:
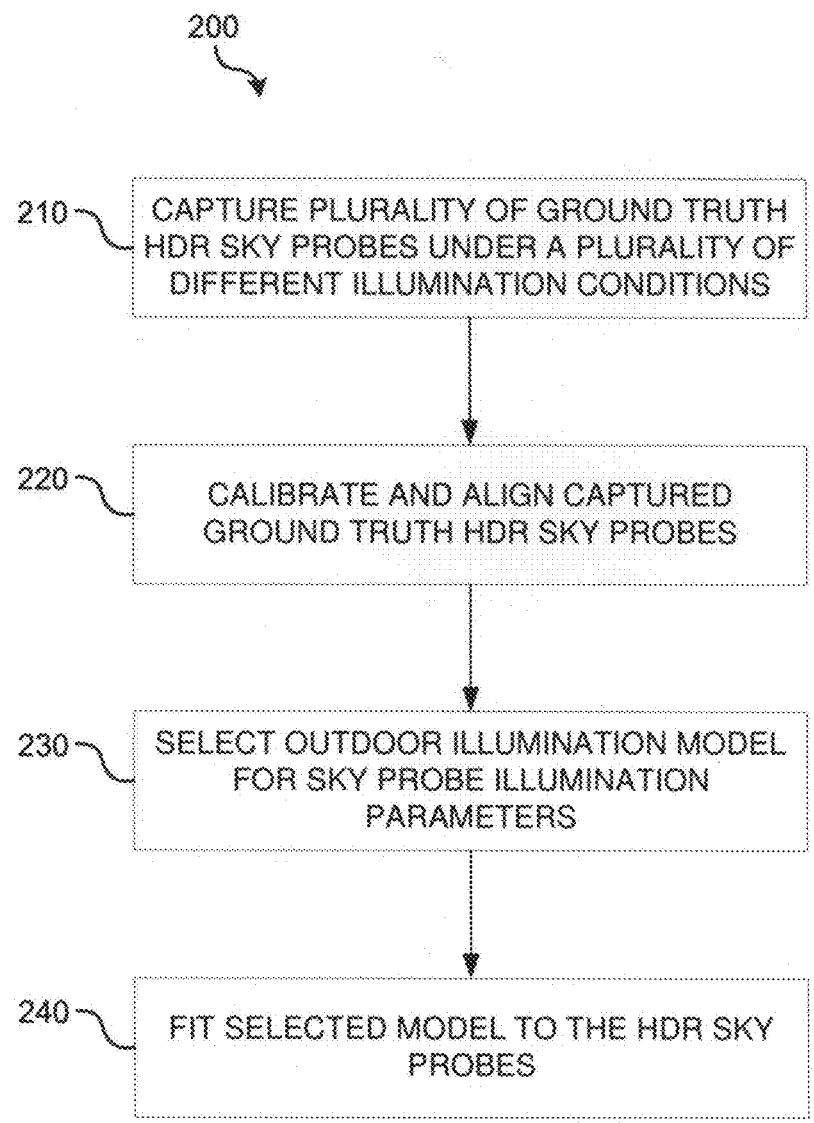
FIG. 2 is an operational flow diagram illustrating an example process for creating a database of HDR sky light probes and fitting an outdoor illumination model to the sky light probes for use in a sky light probe estimation process.

FIG. 2 is an operational flow diagram illustrating an example process 200 for creating a database of ground truth HDR sky light probes and fitting an outdoor illumination model to the HDR sky light probes. The fitted model may subsequently be used in a process for estimating an HDR sky light probe for one or more LDR (or HDR) images.

At operation 210, a plurality of ground truth HDR sky light probes are captured under a plurality of different sky illumination conditions. For example, ground truth HDR sky light probes are created for a plurality of overcast sky conditions, a plurality of partially cloudy conditions, and a plurality of clear sky (i.e. full sunlight) conditions. In one particular implementation, a ground truth sky light probe is captured by installing a camera at a high vantage point (e.g. a roof of a tall building), capturing multiple exposure images of the sky, and combining the multiple exposure images to create a single HDR representation of the sky light probe. In one embodiment, the captured exposures may range from $1/8000$ to 1 second. The camera used to capture the sky light probe may comprise a wide-angle fisheye lens or other lens configured to take wide-angle photographs. In one embodiment, the camera lens is calibrated such that the sky light probe can be mapped to an angular environment map representation.

At operation 220, the captured ground truth HDR sky light probes are calibrated and aligned. For example, in one embodiment the sky light probes are aligned by aligning the exposures of the skies, correcting for camera displacements, and rotating the sky light probe to match the sun position and orientation. In another embodiment, all the captured sky light probes are intensity-normalized on the same relative exposure based on their exposure value.

After completion of operation 220, an HDR sky light probe database dataset has been captured. At operation 230, an outdoor illumination model is selected for modeling the illumination parameters of the HDR sky light probes in the dataset. In process 200, the model is based on a sun model and a sky model for describing the outdoor illumination parameters. The selected sun and sky models provide the benefit of providing low-dimensional models that accurately capture the main sources of light variations in the sky with few parameters, thereby saving in computational resources.

In the illustrated embodiment, the sun and sky are modeled separately. In alternative embodiments, the sun and sky may be modeled together. With reference now to the sun model, the sun model comprises a plurality of illumination parameters for modeling the lighting of the sun. For example, the sun model may comprise the illumination parameters of sun position or direction, sun angular variation or spatial variation, and/or sun color. Each illumination parameter comprises one or more dimensions. For example, sun color may be modeled in three dimensions using an RGB color representation.

In one embodiment, the sun is modeled using a double-exponential distribution that models the sun as a scaled exponential falloff in the log-intensity domain. In one example mathematical implementation of the double-exponential distribution, the sun model may be defined by Equation (1):

$$f_{sun}^c(l) = w_{sun}^c \exp(-\beta \exp(-\kappa/\cos \gamma_1)) \tag{1}$$

Where $\beta$, $\kappa \geq 0$, and are shared across color channels c, $w_{sun}^c$ are weights capturing the mean sun color, l is a given light direction, and $\gamma_1$ is the angle between the light direction l and the direction corresponding to the center of the sun. In other embodiments, additional or alternative parameters may be used to construct a mathematical model of the double exponential sun model. In other embodiments, other sun models may be used.

In an alternative embodiment, the sun may be modeled with a von-Mises Fisher (vMF) distribution as described in A. Banerjee, I. S. Dhillon, J. Ghosh, and S. Sra. *Clustering on the unit hypersphere using von mises-fisher distributions*. Journal of Machine Learning Research, 6:1345-1382, 2005. In this embodiment, the vMF distribution is used to model the intensity of the sun's light direction in an RGB color channel as a function of the direction, color, and diffuseness of the sun. In other embodiments, other sun models may be used.

The sky model similarly comprises a plurality of illumination parameters of one or more dimensions for modeling the lighting of the sky. For example, the sky model may comprise the illumination parameters of sky color, sky angular variation, sky turbidity, and/or the zenith angle of light direction. In one embodiment, the sky may be modeled using the vMF distribution in a similar manner to that described above. In an alternative embodiment, the sky may be modeled using a Preetham model as described in A. J. Preetham, P. Shirley, and B. Smits. *A practical analytic model for daylight*, in SIGGRAPH, August 1999. In one example mathematical implementation of the Preetham sky model, the sky model may be defined as a full-color sky model parameterized by the turbidity t as shown in Equation (2):

$$f_{sky}^c(l) = w_{sky}^c f_{Perez}(\theta_1, \gamma_1, t) \tag{2}$$

Where $\theta_1$ is the zenith angle of light direction l, $\gamma_1$ is the zenith angle's angular difference with respect to the sun position l, t is the sky turbidity, and $w_{sky}^c$ are weights that capture the mean sky color. In this example mathematical implementation each color channel (indexed by c) is modeled independently, but turbidity t is shared across all channels. In other embodiments, additional or alternative parameters may be used to construct a mathematical model of the Preetham sky model.

In yet another embodiment, the sky may be modeled using the classic non-uniform sky model (cosine model) described in P. Moon and D. E. Spencer. *Illumination from a non-uniform sky*, in Transactions of the Illumination Engineering Society, 37, 1942, which may be used to represent the sky variation using a weighted cosine term. In other embodiments, other sky models may be used.

The selected sun and sky models may be combined in any arrangement. The selection of the models may depend on the expected image and illumination conditions of the photograph for which a sky light probe is being estimated (e.g. overcast or clear skies) and/or the desired predictive accuracy of the model (i.e. "fit") versus computational complexity.

Figure 3:
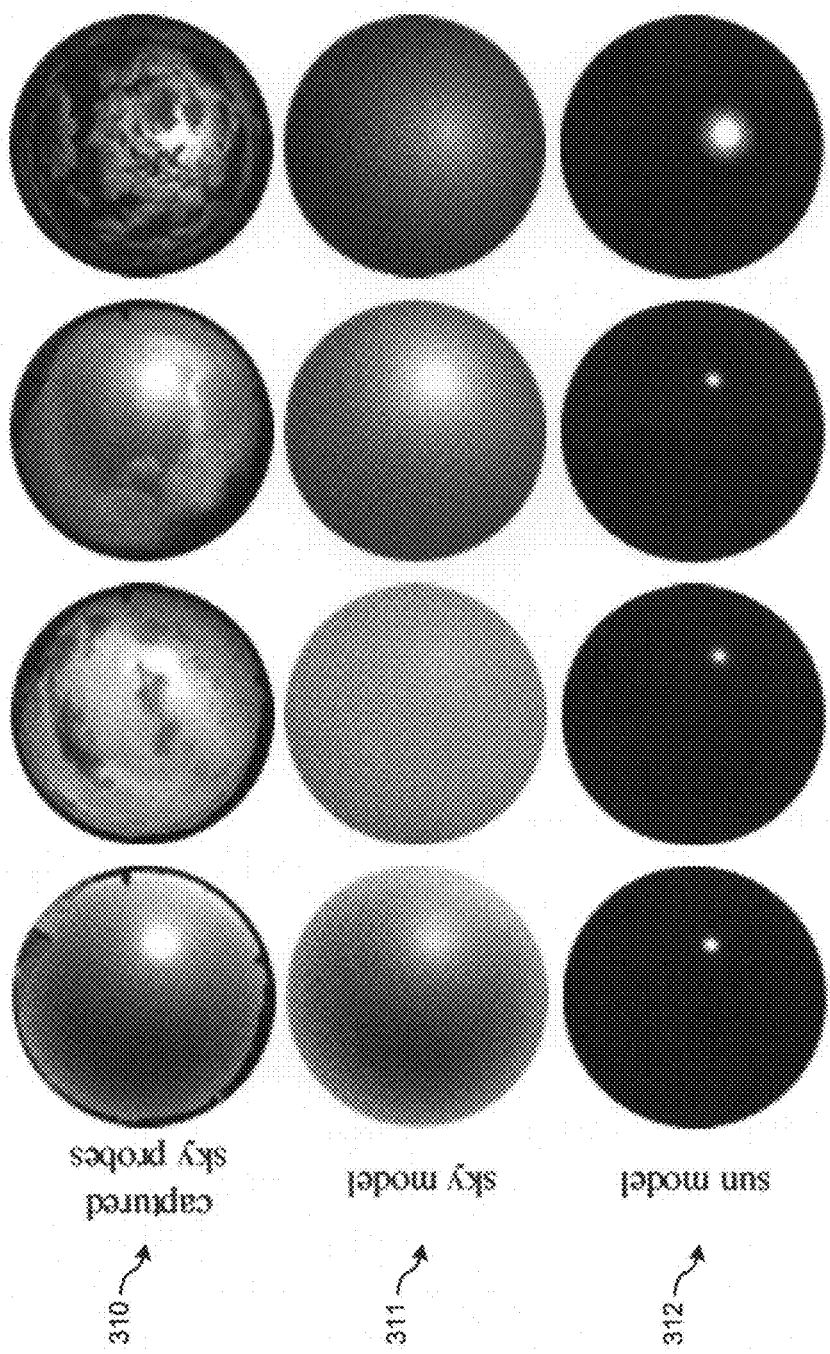
FIG. 3 illustrates an example sun and sky model combination that may be used as an illumination model for an outdoor image.

FIG. 3 illustrates an example illumination model fitted to four ground truth HDR sky light probes 310. The four fitted sky models 311 are based on the Preetham model for the sky as defined by Equation (2). The four fitted sun models 312 are based on the double-exponential distribution model for the sun as defined by Equation (1). The example illumination model has 11 dimensions: 2 for the sun position, 2 for the sun concentration, 3 for the sun color, 3 for the sky color, and 1 for the sky turbidity. This 11-dimensional illumination model may written as the sum of its sun and sky components, parameterized by vectors $q_{sky}=[w_{sky}^c\ t]$, $q_{sun}=[w_{sun}^c\ \beta\kappa]$, and $l_{sun}=[\theta_{sun}\ \varphi_{sun}]$ as described by Equation (3):

$$f_{ill}^c(l;q_{sun},q_{sky},l_{sun}) = f_{sun}^c(l;q_{sun},l_{sun}) + f_{sky}^c(l;q_{sky},l_{sun}) \quad (3)$$

Following the selection of a sun and sky model for modeling the illumination parameters of a sky light probe, at operation 240 the selected sun model and sky model are fitted to the sky light probes of the ground truth HDR sky light probe database. In one embodiment, the sun and sky models may be fitted to the ground truth HDR sky light probes by applying a non-linear least-squares fitting method. In this embodiment, the fitting method may further comprise fitting parameters to ranges that avoid ambiguities in explaining the causes of a sky's appearance. For example, the parameter fitting range may be chosen such that the fitted model always estimates the most probable cause (i.e. composition of sun and sky) of particular illumination conditions. Alternatively, the fitted model may be chosen based on the expected cause of the illumination conditions of the outdoor images for which the sky light probes are estimated.

With the ground truth HDR sky light probe database and fitted models, an HDR sky light probe may then be estimated for an outdoor image.

FIG. 4 is an operational flow diagram illustrating an example process 400 for estimating an HDR sky light probe for a single outdoor image 401. As further described below, exemplary process 400 leverages an HDR sky light probe database 510 comprising HDR sky light probes captured under a plurality of illumination conditions (e.g. the one created by process 200) to constrain the estimated HDR sky light probe to lie in the space of captured HDR sky light probes.

In various embodiments, process 400 may be executed by processor 134 of sky light probe estimation device 130 through sky light probe estimation application 133. For example, in one embodiment the process may be used to estimate an HDR sky light probe for an LDR image captured by a camera (not shown) of device 130 and/or retrieved from storage 132. In other embodiments the process may be used to estimate an HDR sky light probe for an LDR image retrieved from other sources such as the Internet.

Given an outdoor image 401 as an input, at operation 402 a three-dimensional (3D) model is fitted to an object of interest that is detected in image 401. For example, in one embodiment a detected object of interest is a human face that is facing the camera. The variations in shading of the human face provide cues about the direction of the sun and its intensity, thereby providing a naturally-occurring and readably available calibration object. In implementations of this embodiment, the fully automatic method described in, Saragih, J. M., Lucey, S., and Cohn, J. F. 2009, Face alignment through subspace constrained mean-shifts, *International Conference on Computer Vision*, IEEE, 1034-1041, is used to detect the face and obtain a coarse 3D face mesh, which results in approximate face normals n. In further implementations of this embodiment, it may be assumed that the face has constant Lambertian reflectance to reduce the computational complexity. Alternatively, the varying Lambertian reflectance of the face may be considered as an additional parameter of the fitted 3D model.

In other embodiments, a 3D model may be fitted to other objects of interest such as a Lambertian building or a statue. In yet further embodiments, operation 402 may comprise identifying a plurality of objects of interest in image 401 and creating a 3D model of the object that will lead to the best estimation of the HDR sky light probe for image 401.

Given the fitted 3D model of the object of interest, a two-stage inverse lighting optimization technique is subsequently applied at operations 403-405 to recover lighting parameters that best reproduce the object's appearance (e.g. albedos reflectance, and geometry). In various embodiments given the geometry of the object (from the 3D modeling), the lighting optimization technique may be used to find the albedo and lighting parameters such that the predicted appearance of the modeled object best matches its actual appearance in the image. In various implementations of this optimization technique, a rendering equation may be used to predict what the appearance of the object should be in an image given the object's geometry, albedos, and reflectance. During both stages of lighting optimization, the space of possible HDR sky light probes is constrained by the HDR sky light probes of HDR sky light probe database 510.

At operation 403, a directional lighting model is optimized over the space of HDR sky light probes to estimate the position of the sun relative to the object of interest in image 401. For example, in some embodiments a direct and ambient lighting model may be implemented to estimate the sun position relative to the object of interest. The direct and ambient lighting model may approximate the outdoor lighting by a sum of a directional lighting and omnidirectional lighting of constant intensity. An exemplary mathematical framework for this optimization where a face is the object of interest may be defined by Equation (4):

$$\operatorname*{argmin}_{l_{sun}} \sum_{i \in P} ((L_d \max(0, \langle n_i, l_{sun} \rangle) + L_a) - I_i)^2 \quad (4)$$

Where P={1 . . . N} is the set of pixel indices belonging to the face in image l, $n_i$ are the normals associated with each pixel, $L_d$ is the direct light intensity, and $L_a$ is the ambient light intensity. In one embodiment, the values of Equation (4) may be initialized by solving it without the max(0, .) term. Although the above set of parameters (e.g. direct intensity, ambient light intensity, and surface normals) are used for developing an exemplary mathematical formulation for the directional lighting model, in other embodiments additional or alternative parameters may be used.

Given the estimated position of the sun from the optimized directional lighting model, at operation 404 a hemispherical lighting model is initialized based on the sun position estimated at operation 403. In one embodiment, the hemispherical sky illumination model is based on the double-exponential sun model and the Preetham sky model.

At operation 405, the initialized hemispherical lighting model is optimized over the space of HDR sky light probes to estimate the HDR sky light probe of outdoor image 401. For example, in embodiments where the face is the object of interest, an exemplary mathematical framework for this optimization may be further derived from Equation (4) as follows. Assuming constant Lambertian reflectance of the face, the appearance of a pixel $B_i$ with surface normal $n_i$ and albedo $\rho_i$ is given by Equation (5):

$$B_i(q_{ill}) = \rho_i \int_\Omega f_{ill}(l; q_{ill})(n_i, l) dl \qquad (5)$$

Where $q_{ill} = [q_{sun}\ q_{sky}\ l_{sun}]$ is the set of all eleven lighting parameters of a double exponential sun illumination model and Preetham sky illumination model. Equation (5) may be discretized by representing $f_{ill}(l_j, q_{ill})$ as an environment where each pixel j stores the light intensity corresponding to a direction $l_j$, as given by Equation (6):

$$B_i(q_{ill}) = \rho_i \sum_{j=1}^{N_1} f_{ill}(l_j, q_{ill})(n_i, l_j) w_j \qquad (6)$$

Where $w_j$ is the solid angle of pixel j, and $N_1$ is the total number of pixels in the environment map. Given a way to predict the appearance of a pixel $B_i$ from illumination parameters $q_{ill}$, the lighting parameters that best match the image may be optimized by solving Equation (7):

$$\underset{q_{ill}}{\operatorname{argmin}} \sum_{i \in P} (B_i(q_{ill}) - I_i)^2 + \lambda \psi(q_{ill}) \qquad (7)$$

Where $\psi(q_{ill})$ models the likelihood of observing a certain set of illumination parameters $q_{ill}$ corresponding to a particular sky light probe in sky light probe database 510, and where $\lambda$ is a weight factor for $\psi(q_{ill})$. In one embodiment, $\lambda$ is set to 1. Fitting an illumination model based on the double exponential sun model and Preetham sky model to all instances in sky light probe database 510 as described in process 200 results in a plurality of parameter vectors $q_{ill}$. Using these parameter vectors, a kernel density estimator (KDE) may be used to determine the likelihood $\psi(q_{ill})$ of a test vector q by evaluating the KDE at that point. In one embodiment, Equation (7) is optimized by initializing it from several starting points, and choosing the answer that results in the lowest error. In one embodiment, the starting points may be sorted by $$\sum_{i \in P} (B_i(q_{ill}) - I_i)^2.$$

In further embodiments, the face may be modeled with a constant albedo $\rho_i$.

Figure 5A:
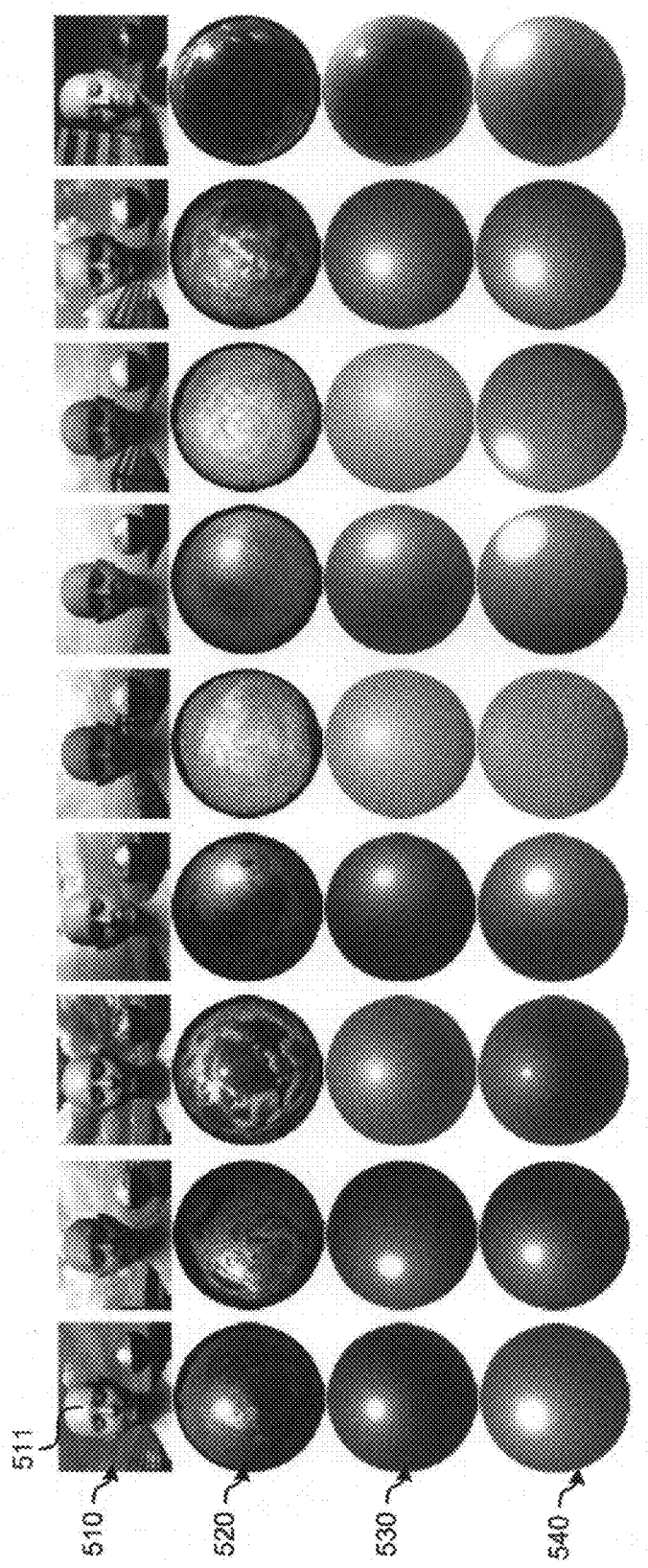
FIG. 5A illustrates a plurality of LDR input images comprising a face, the ground truth sky light probes for the input images, a double exponential sun and Preetham sky model fit for the ground truth sky light probes, and the corresponding HDR sky light probes estimated for the input images using the process of FIG. 4.

FIG. 5A illustrates a plurality of LDR input images 510 comprising a face 511, the ground truth sky light probes 520 for the input images, a double exponential sun and Preetham sky model fit 530 for the ground truth sky light probes, and HDR sky light probes 540 estimated for the input images using process 400 with face 511 as the object of interest. As illustrated, accurate HDR sky light probes 540 are estimated from single LDR face images 510 in a variety of different illumination conditions, ranging from overcast, to partially cloudy, to full sunlight.

Once a sky light probe is estimated for outdoor image 401, at operation 406 a virtual object is inserted into an outdoor image and relit using the predicted sky light probe. For example, the inserted virtual object may be relit using the image based lighting pipeline.

In one embodiment, the virtual object may be inserted and relit into input outdoor image 401. In an alternative embodiment, the virtual object may be inserted and relit into a second outdoor image captured for the same scene. In this alternative embodiment, for example, a user of a mobile device including a sky light probe estimation application may take a selfie picture using a front facing camera of the mobile device. Based on the captured user's face, the sky light probe estimation application may then be used to estimate an HDR sky light probe for the scene. Subsequently, the user may turn around and take a second image of the same scene using a back facing camera of the mobile device. Because the second captured outdoor image is of the same scene (minus the user's face) as the selfie outdoor image, the HDR sky light probe estimated from the selfie image may be used to accurately relight a virtual object into the second outdoor image.

FIG. 5B illustrates LDR input images 550 and a corresponding rendered selfie 551, images 560 with a virtual object relit by the ground truth light probe of images 550, images 570 with a virtual object relit by the double exponential sun and Preetham sky model fit for the ground truth light probes, and images 580 with a virtual object relit by the sky light probe estimated from the face images using method 400. As illustrated, method 400 accurately captures many lighting conditions and reproduces complex lighting effects such as cast shadows.

FIG. 6 is an operational flow diagram illustrating an example process 600 for estimating a plurality of HDR sky light probes for a corresponding plurality of outdoor images associated with the same scene. Process 600 may be used to estimate the lighting of the outdoor images associated with the scene given that the color and material properties of the scene are known. For example, process 600 may be applied to a plurality of images for a building or other outdoor object.

FIG. 6 is concurrently described with FIG. 7, which illustrates example outputs generated by process 600 based on an example set of input landmark images 710. As further described below, exemplary process 600 leverages 1) HDR sky light probe database 510 to constrain the HDR sky light probe estimated for each image 710 to lie in the space of captured HDR sky light probes; and 2) a second independent database of images 710 corresponding to a landmark.

Given a database of images 710 corresponding to a landmark as an input, at operation 601 a 3D reconstruction of the landmark is generated. In one embodiment, the 3D reconstruction is generated using a large-scale structure-from-motion (SfM) algorithm that recovers a triangular mesh 720. Given the 3D reconstruction of the landmark, a two-stage inverse lighting optimization technique is subsequently applied to each image 710 at operations 602-605 to recover lighting parameters that best reproduce the 3D reconstructed landmark's appearance (e.g. albedos, occlusions, and reflectance). As in process 400, during both stages of lighting optimization the space of possible HDR sky light probes is constrained by the HDR sky light probes of HDR sky light probe database 510. At operation 602, for each image a directional lighting model is optimized over the space of HDR sky light probes to estimate the position of the sun relative to the landmark. At operation 603, a hemispherical lighting model is initialized based on the estimated positions of the sun. At operation 604, for each image a hemispherical lighting model is optimized over the space of HDR sky light probes to estimate the HDR sky light probe of the respective image.

FIG. 8 illustrates two sets of LDR input images 801 and 811 associated with two different landmarks 800 and 810, the ground truth sky light probes 802 and 812 for the input images, and HDR sky light probes 803 and 813 estimated for the input images using process 600. As illustrated, while some high-frequency cloud details such as cloud textures are lost, the main characteristics of the sky hemisphere such as the sun color, the sky color, and the general spatial variation of the sun and sky colors are accurately estimated using only the corresponding landmark's appearance.

Figure 9:
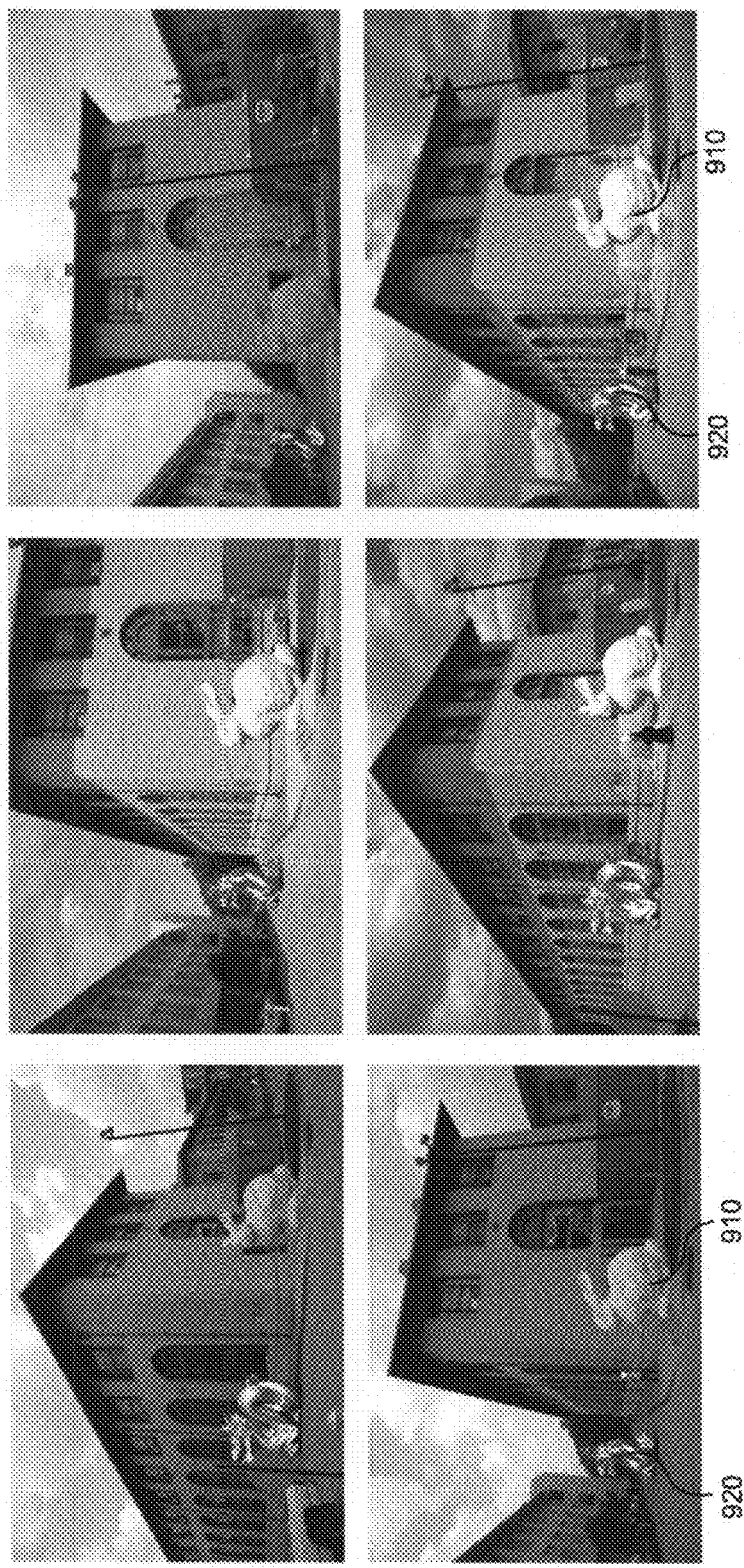
FIG. 9 illustrates a set of six images associated with a scene where two virtual objects have been inserted and relit into the images based on sky light probes estimated for each of the images using the process of FIG. 6.

FIG. 9 illustrates a set of six images associated with a scene. As illustrated, two virtual objects 910 and 920 have been inserted and relit into the images based on sky light probes estimated for each of the images using process 600. As illustrated, the virtual objects are consistently lit in each image of the scene based on the estimated illumination conditions of each image.

In one embodiment, sky light probe estimation processes 400 or 600 may be used to dynamically model the lighting conditions of a video comprising a plurality of image frames. In this embodiment, the temporal movements of the image frame are incorporated in the sky light probe estimation model's parameters. The estimated sky light probe may be temporally updated based on a predefined frequency, sudden changes in the lighting conditions of the image scene, movements away from the image scene, the introduction of objects or occluders into the image scene, or some combination thereof. For example, in videos where the image frame remains relatively static over time, the sky light probe estimated for one image frame may be reused for subsequent image frames, assuming the lighting conditions of the scene do not suddenly change. In one implementation of this embodiment, temporal smoothness (across frames) is imposed as a condition of the model.

Figure 10:
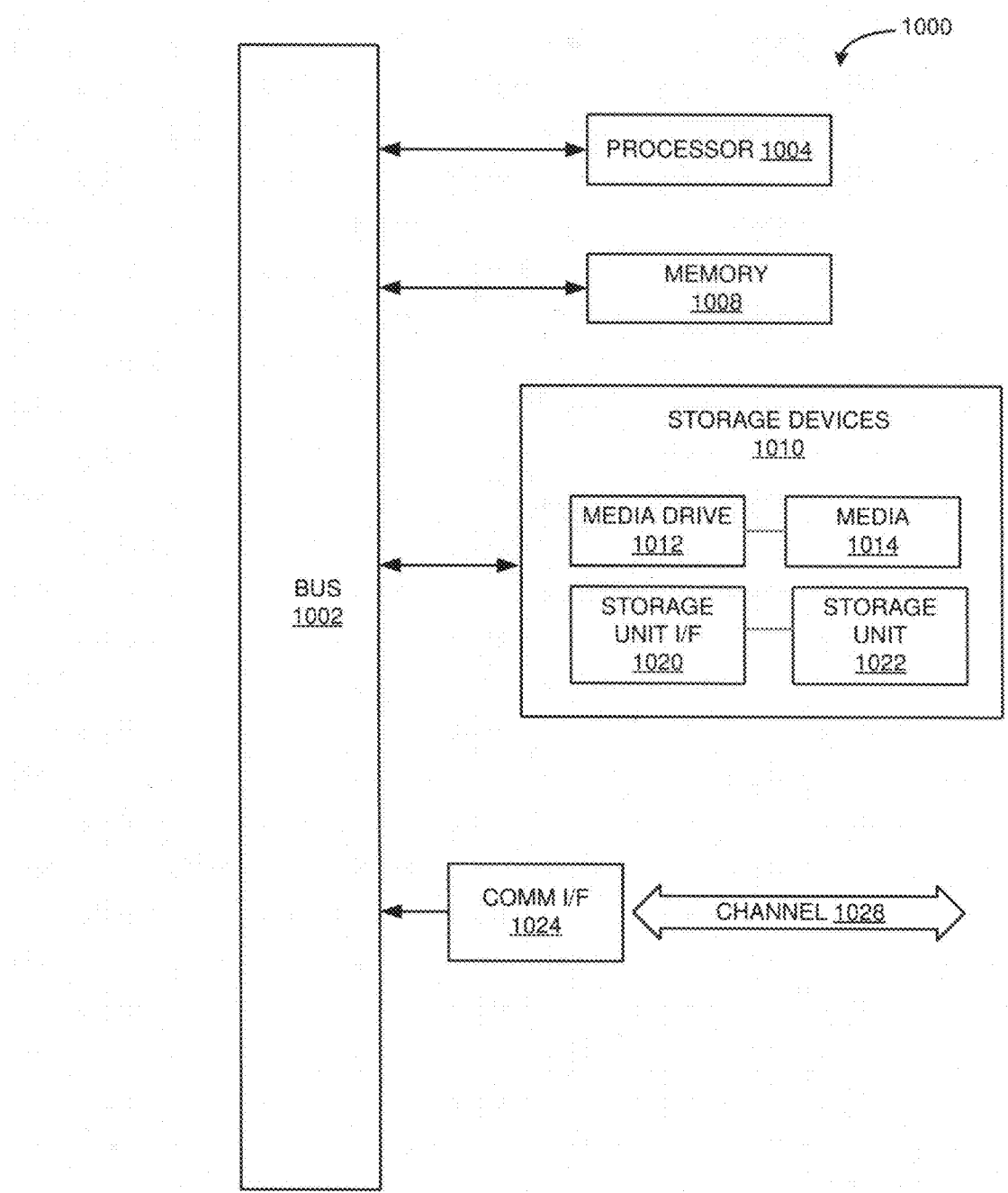
FIG. 10 illustrates an example computing module that may be used to implement various features of the systems and methods for estimating sky light probes disclosed herein.

FIG. 10 illustrates an example computing module that may be used to implement various features of the systems and methods for estimating sky light probes disclosed herein. As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 10. Various embodiments are described in terms of this example-computing module 1000. After reading this description, it will become apparent to a person skilled in the relevant art how to implement the application using other computing modules or architectures.

Referring now to FIG. 10, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical disk drive, a CD, DVD, or Blu-ray drive (R or RW), or other removable or fixed media drive might be provided. Accordingly, storage media 1014 might include, for example, a hard disk, a solid state drive, magnetic tape, cartridge, optical disk, a CD, DVD, Blu-ray or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
a camera for capturing an outdoor image;
one or more processors; and
one or more non-transitory computer-readable mediums operatively coupled to at least one of the one or more processors and having instructions stored thereon that, when executed by at least one of the one or more processors, cause at least one of the one or more processors to:
fit a three-dimensional (3D) model to an object of interest in the outdoor image; and
estimate a sky light probe for the outdoor image by applying an inverse optimization lighting algorithm based on the fitted 3D model, wherein applying an inverse optimization lighting algorithm based on the fitted 3D model comprises constraining lighting of the optimization light algorithm to a set of a plurality of precaptured sky light probes captured under a plurality of sky illumination conditions.

2. The system of claim 1, wherein illumination parameters of the estimated sky light probe comprise sun illumination parameters based on a sun model and sky illumination parameters based on a sky model, wherein the sun illumination parameters include a position of the sun.

3. The system of claim 1, wherein applying an inverse optimization light algorithm comprises optimizing a directional lighting model over the space of precaptured sky light probes to estimate a sun position.

4. The system of claim 3, wherein applying an inverse optimization light algorithm comprises:
initializing a hemispherical lighting model based on the estimated sun position; and
optimizing the hemispherical lighting model over the space of precaptured sky light probes.

5. The system of claim 1, wherein the one or more non-transitory computer-readable mediums when executed by at least one of the one or more processors, further cause at least one of the one or more processors to:
insert a virtual three-dimensional (3D) object into the outdoor image; and
relight the virtual 3D object using the estimated sky light probe.

6. The system of claim 1, wherein:
the captured outdoor image is a low dynamic range (LDR) image;
the precaptured sky light probes are high dynamic range (HDR) sky light probes; and
the estimated sky light probe is an HDR sky light probe.

7. The system of claim 2, wherein the sun model is based on a double exponential sun model.

8. The system of claim 7, wherein the sky model is based on a Preetham sky model.

9. The system of claim 1, wherein the object of interest is a human face.

10. The system of claim 1, further comprising a storage that stores the precaptured sky light probes.

11. A method, comprising:
capturing an outdoor image with a camera;
fitting a three-dimensional (3D) model to an object of interest in the outdoor image; and
estimating a sky light probe for the outdoor image by applying an inverse optimization lighting algorithm based on the fitted 3D model, wherein applying an inverse optimization lighting algorithm based on the fitted 3D model comprises constraining lighting of the optimization light algorithm to a set of a plurality of precaptured sky light probes captured under a plurality of sky illumination conditions.

12. The method of claim 11, wherein illumination parameters of the estimated sky light probe comprise sun illumination parameters based on a sun model and sky illumination parameters based on a sky model, wherein the sun illumination parameters include a position of the sun.

13. The method of claim 11, wherein applying an inverse optimization light algorithm comprises optimizing a directional lighting model over the space of precaptured sky light probes to estimate a sun position.

14. The method of claim 13, wherein applying an inverse optimization light algorithm comprises:
  initializing a hemispherical lighting model based on the estimated sun position; and
  optimizing the hemispherical lighting model over the space of precaptured sky light probes.

15. The method of claim 11, further comprising:
  inserting a virtual object into the outdoor image; and
  relighting the virtual object using the estimated sky light probe.

16. The method of claim 11, wherein:
  the captured outdoor image is a low dynamic range (LDR) image;
  the precaptured sky light probes are high dynamic range (HDR) sky light probes; and
  the estimated sky light probe is an HDR sky light probe.

17. The method of claim 11, wherein the object of interest is a human face.

* * * * *